US011931983B2

(12) United States Patent
Hagiwara

(10) Patent No.: US 11,931,983 B2
(45) Date of Patent: Mar. 19, 2024

(54) PRESSING METHOD AND METHOD OF MANUFACTURING MECHANICAL APPARATUS

(71) Applicant: NSK LTD., Tokyo (JP)

(72) Inventor: Nobuyuki Hagiwara, Fujisawa (JP)

(73) Assignee: NSK LTD., Tokyo (JP)

( * ) Notice: Subject to any disclaimer, the term of this patent is extended or adjusted under 35 U.S.C. 154(b) by 0 days.

(21) Appl. No.: 17/266,851

(22) PCT Filed: Aug. 19, 2020

(86) PCT No.: PCT/JP2020/031246
§ 371 (c)(1),
(2) Date: Feb. 8, 2021

(87) PCT Pub. No.: WO2021/039526
PCT Pub. Date: Mar. 4, 2021

(65) Prior Publication Data
US 2021/0260844 A1 Aug. 26, 2021

(30) Foreign Application Priority Data
Aug. 23, 2019 (JP) ................................ 2019-153230

(51) Int. Cl.
*B30B 1/32* (2006.01)
*B21J 5/02* (2006.01)
(Continued)

(52) U.S. Cl.
CPC .................. *B30B 1/32* (2013.01); *B21J 5/02* (2013.01); *B21J 5/08* (2013.01); *B21J 5/10* (2013.01); *B30B 1/06* (2013.01); *B30B 15/00* (2013.01)

(58) Field of Classification Search
CPC ... B30B 1/06; B30B 1/32; B30B 15/00; B21J 5/02
(Continued)

(56) References Cited

U.S. PATENT DOCUMENTS 1,633,970 A * 6/1927 Ball ........................... B21J 9/12 72/356
3,606,638 A * 9/1971 Putkowski .............. B30B 15/06 425/451.2
(Continued)

FOREIGN PATENT DOCUMENTS

DE 30 17 054 A1 11/1981
DE 102016012803 A1 * 4/2018 ........... B30B 15/041
(Continued)

OTHER PUBLICATIONS

International Search Report of PCT/JP2020/031246 dated Nov. 10, 2020 [PCT/ISA/210].
(Continued)

*Primary Examiner* — Jimmy T Nguyen
*Assistant Examiner* — Smith Oberto Bapthelus
(74) *Attorney, Agent, or Firm* — Sughrue Mion, PLLC

(57) ABSTRACT

A method of performing pressing on a workpiece using a press machine. The pressing method includes: performing pressing on the workpiece between a lower die and an upper die by causing the upper die to approach the lower die by using the hydraulic cylinder in a state in which the workpiece is disposed between the lower die and the upper die, and performing the pressing on the workpiece between the lower die and the upper die, in a state in which a shape of each of the frame, the lower die and the upper die has a rotationally symmetric shape about the reference axis and in which the workpiece center axis coincides with the reference axis.

2 Claims, 12 Drawing Sheets

(51) Int. Cl.

| | |
|---|---|
| ***B21J 5/08*** | (2006.01) |
| ***B21J 5/10*** | (2006.01) |
| ***B30B 1/06*** | (2006.01) |
| ***B30B 15/00*** | (2006.01) |

(58) Field of Classification Search
USPC .................................................... 72/353, 356
See application file for complete search history.

(56) References Cited

U.S. PATENT DOCUMENTS

| | | | | | |
|---|---|---|---|---|---|
| 4,061,186 | A | | 12/1977 | Ljung | |
| 4,360,189 | A | | 11/1982 | Duncan et al. | |
| 4,558,579 | A | * | 12/1985 | Petkov | B21D 39/20 72/56 |
| 5,823,104 | A | * | 10/1998 | Beisel | B30B 15/04 100/269.09 |
| 2016/0361744 | A1 | * | 12/2016 | Hirata | H01M 8/0202 |
| 2018/0193901 | A1 | | 7/2018 | Yang | |

FOREIGN PATENT DOCUMENTS

| | | | |
|---|---|---|---|
| EP | 0 172 300 | A1 | 2/1986 |
| JP | 58-76400 | U | 5/1983 |
| JP | 6-269894 | A | 9/1994 |
| JP | 2005-238248 | A | 9/2005 |
| JP | 2008-080339 | A | 4/2008 |
| JP | 2008-296241 | A | 12/2008 |
| WO | 95/27615 | A1 | 10/1995 |

OTHER PUBLICATIONS

Written Opinion of PCT/JP2020/031246 dated Nov. 10, 2020 [PCT/ISA/237].

Extended European Search Report dated Aug. 4, 2023 in Application No. 20858896.2.

Office Action dated Oct. 3, 2023 in Japanese Application No. 2021-071805.

* cited by examiner

PRESSING METHOD AND METHOD OF MANUFACTURING MECHANICAL APPARATUS

CROSS REFERENCE TO RELATED APPLICATIONS

This application is a National Stage of International Application No. PCT/JP2020/031246, filed Aug. 19, 2020, claiming priority to Japanese Patent Application No. 2019-153230, filed Aug. 23, 2019.

TECHNICAL FIELD

The present invention relates to a method of performing pressing on a workpiece that is a material to be processed using a press machine, and a method of manufacturing a mechanical apparatus.

BACKGROUND ART

By incorporating pressing processes into processes of manufacturing metal parts that constitute various mechanical apparatuses such as automobiles, industrial machines, or the like, the manufacturing efficiency of the metal parts can be increased (for example, see Japanese Unexamined Patent Application, First Publication No. 2008-296241 (Patent Literature 1)). Further, there are many types of pressing such as shearing, drawing, bending, forging, and the like.

A press machine used for pressing includes a frame having a reference axis, a first die, and a second die. The first die is supported by the frame. The second die is supported by the frame to allow retreating and approaching movement with respect to the first die in an axial direction of the reference axis. Then, in a state in which a workpiece is disposed between the first die and the second die, pressing is performed on the workpiece between the first die and the second die by bringing the second die and the first die close together.

CITATION LIST

Patent Literature

Patent Literature 1

Japanese Unexamined Patent Application, First Publication No. 2008-296241

SUMMARY OF INVENTION

Technical Problem

As a method of increasing processing accuracy with respect to a workpiece in pressing using a press machine, a method of manufacturing a first die and a second die accurately or increasing coaxiality of a first die and a second die with respect to a reference axis of a frame in an assembled state of a press machine, can be considered.

However, even if such a method is employed, when the pressing is performed, elastic deformation may occur in the first die, the second die and the frame due to a processing reaction applied from the workpiece to the first die and the second die. Then, when a relative inclination occurs between the first die and the second die on the basis of occurrence such elastic deformation, the processing accuracy with respect to the workpiece is lowered or a large force may be required to bring the second die and the first die close together, i.e., the energy loss is increased.

In consideration of the above-mentioned circumstances, the present invention is directed to realizing a pressing method capable of improving processing accuracy with respect to a workpiece and minimizing energy loss.

Solution to Problem

A first aspect of a pressing method of the present invention is a method of performing pressing on a workpiece using a press machine including a frame having a reference axis, a first die supported by the frame, a second die supported by the frame so as to enable retreating and approaching movement with respect to the first die in an axial direction of the reference axis, and a hydraulic cylinder configured to generate a force in a direction in which the second die approaches the first die, the pressing method including performing the pressing on the workpiece between the first die and the second die by causing the second die to approach the first die by pressing the second die against the first die using the hydraulic cylinder in a state in which the workpiece is disposed between the first die and the second die, the workpiece having a workpiece center axis and having a rotationally symmetric shape about the workpiece center axis. In the first aspect, the pressing is performed on the workpiece in a state in which a shape of each of the frame, the first die and the second die has a rotationally symmetric shape about the reference axis and in which the workpiece center axis coincides with the reference axis. Further, rotational symmetry is one of symmetries that characterize a figure (shape), and means that, when a spatial figure is rotated around one axis, if it matches the first figure after every angle $2\pi/n$ (n: a positive integer of 2 or more), the figure has rotational symmetry of order n (n-th order symmetry). In the present invention, in the case of $n=1$ (since it is self-evident that after rotation by 360° there will be overlapping, it cannot be said that there is symmetry), this is not referred to as rotational symmetry. In the specifications and claims, a shape with rotational symmetry may be expressed as a rotationally symmetric shape, and a shape without rotational symmetry may be expressed as a rotationally asymmetric shape.

In one aspect of the first aspect of the pressing method of the present invention, the frame may have a first frame section configured to support the first die, a second frame section configured to support the second die, and a plurality of pillar sections configured to connect the first frame section and the second frame section. In this case, for example, when the order of rotational symmetry related to a shape of the workpiece is n (n: a positive integer of 2 or more), the number of the pillar section is $n\times2^k$ (k: 0 or a positive integer), and the pillar sections is disposed at equal intervals in a circumferential direction about the reference axis.

A second aspect of the pressing method of the present invention is a method of performing pressing on a workpiece using a press machine including a frame having a reference axis, a first die supported by the frame, a second die supported by the frame so as to enable retreating and approaching movement with respect to the first die in an axial direction of the reference axis, and a hydraulic cylinder configured to generate a force in a direction in which the second die approaches the first die, the pressing method including performing the pressing on the workpiece between the first die and the second die by causing the second die to approach the first die by pressing the second die against the first die using the hydraulic cylinder in a state in which the workpiece is disposed between the first die and the second die, the workpiece having a rotationally asymmetric shape when seen in an axial direction of the reference axis. The second aspect includes a radial direction positioning process and a pressing process. In the radial direction positioning process, a test is performed to obtain a relationship between positions of the first die and the second die in a radial direction about the reference axis when the pressing is performed on the workpiece and a relative inclination amount between the first die and the second die generated when the pressing is performed on the workpiece, and one position in the radial direction in which the inclination amount becomes equal to or smaller than a predetermined value is determined by using the relationship. In the pressing process, the pressing is performed on the workpiece in a state in which the first die and the second die are disposed at the one position in the radial direction which was determined in the radial direction positioning process.

A third aspect of the pressing method of the present invention is a method of performing pressing on a workpiece using a press machine including a frame having a reference axis, a first die supported by the frame, a second die supported by the frame so as to enable retreating and approaching movement with respect to the first die in an axial direction of the reference axis, and a link mechanism, and the pressing method includes pressing on the workpiece between the first die and the second die by causing the second die to approach the first die by pressing the second die against the first die using the link mechanism in a state in which the workpiece is disposed between the first die and the second die. Here, the link mechanism has a driving source, a first link member rotatably driven by the driving source and a second link member that is provided with one end portion thereof being rotatably supported by a portion of the first link member which is deviated in the radial direction from a rotation center axis of the first link member and that is provided with other end portion thereof being rotatably supported by the second die.

The third aspect includes a radial direction positioning process and a pressing process.

In the radial direction positioning process, a test is performed to obtain a relationship between positions of the first die and the second die in the radial direction about the reference axis when the pressing is performed on the workpiece and a relative inclination amount between the first die and the second die generated when the pressing is performed on the workpiece, and one position in the radial direction in which the inclination amount becomes equal to or smaller than a predetermined value is determined by using the relationship. In the pressing process, the pressing is performed on the workpiece in a state in which the first die and the second die are disposed at the one position in the radial direction which was determined in the radial direction positioning process.

In the second aspect and the third aspect of the pressing method of the present invention, for example, the inclination amount can be measured using a laser displacement sensor when the test is performed.

A mechanical apparatus that is a target of the manufacturing method of the present invention includes metal parts. A method of manufacturing the mechanical device of the present invention includes a process of executing the pressing method according to the present invention in a process of manufacturing the metal parts.

Advantageous Effects of Invention

According to the present invention, it is possible to minimize energy loss while improving processing accuracy with respect to a workpiece.

DESCRIPTION OF EMBODIMENTS

First Example of Embodiment

Figure 1:
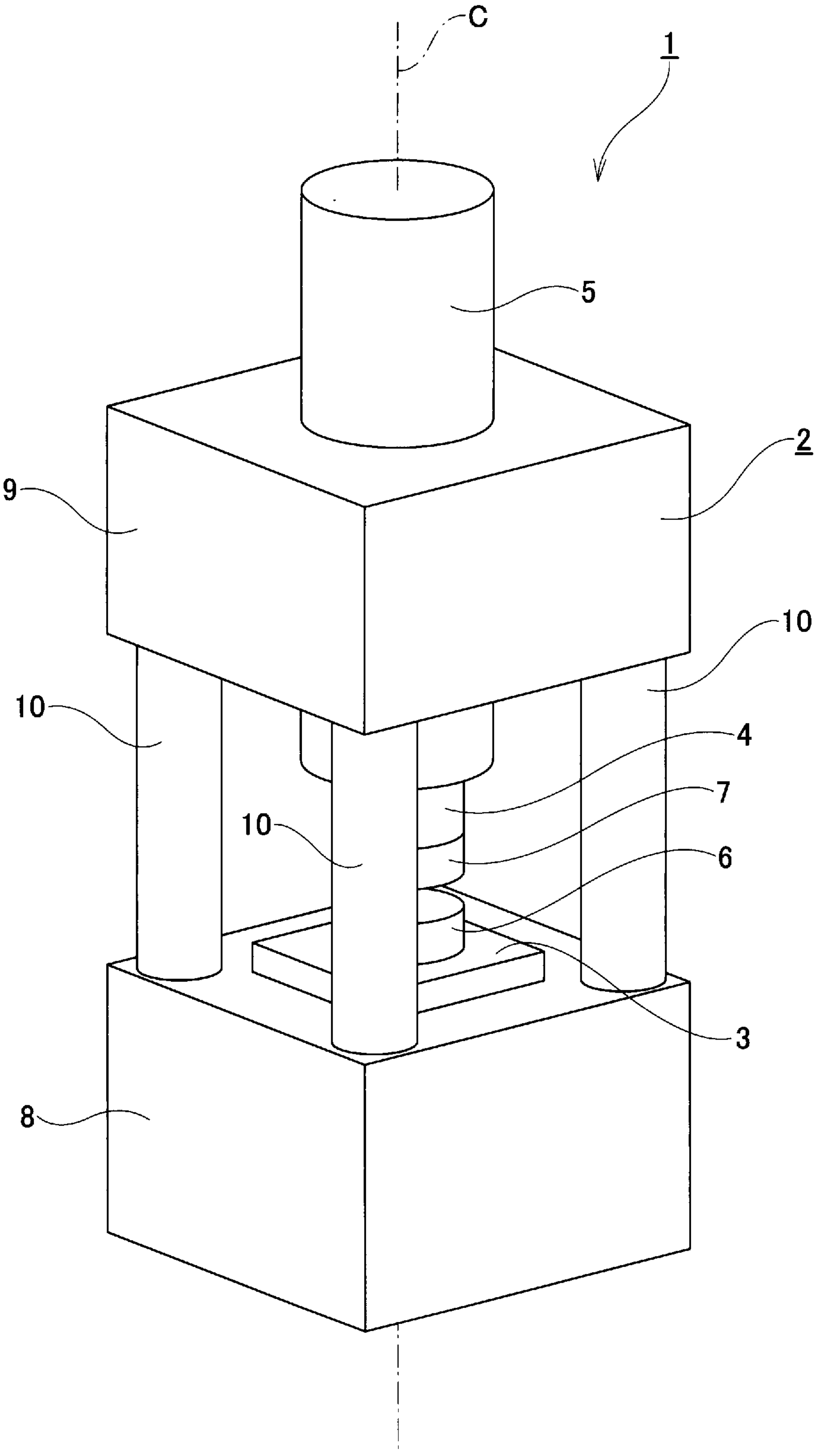
FIG. 1 is a perspective view schematically showing a press machine of a first example of an embodiment.

A first example of an embodiment of the present invention will be described with reference to FIGS. 1 to 4.

The example is an example in which pressing is performed on a workpiece 11 (see FIGS. 2 and 4) that is an initial material or an intermediate material of metal parts using a hydraulic press machine 1 in a process of manufacturing the metal parts that constitute various mechanical apparatuses such as an automobile, an industrial machine, or the like. In particular, in the example, the workpiece 11 has a workpiece center axis that is a center axis thereof and a rotationally symmetric shape about the workpiece center axis in states before and after the pressing is performed.

The press machine 1 includes a reference axis C in an upward/downward direction that is a press center, a frame 2, a bolster 3, a slide 4, a hydraulic cylinder 5, a lower die 6 that is a first die, and an upper die 7 that is a second die.

The frame 2 includes a lower frame section 8 that is a first frame section, an upper frame section 9 that is a second frame section disposed above the lower frame section 8, and a plurality of pillar sections 10 that connect the lower frame section 8 and the upper frame section 9. Each of the pillar sections 10 extends in the upward/downward direction, and has a lower end portion coupled to the lower frame section 8 and an upper end portion coupled to the upper frame section 9.

The frame 2 has a rotationally symmetrical shape about the reference axis C, and in particular, in the example, has a four-fold symmetrical shape about the reference axis C. For this reason, in the example, each of the lower frame section 8 and the upper frame section 9 has a rectangular parallelepiped shape that is a square shape when seen in a plan view (shown in FIG. 3, a shape seen from above).

A phase of the shape of the lower frame section 8 when seen in a plan view (a square shape) and a phase of the shape of the upper frame section 9 when seen in a plan view (a square shape) in a circumferential direction about the reference axis C (of an apex at which each of the sides cross each other) coincide with each other. The number of pillar sections 10 is four. The pillar sections 10 each have a columnar shape, are located at four places at equal intervals about the reference axis C in the circumferential direction, and are disposed at four corners of the lower frame section 8 and the upper frame section 9 when seen in a plan view.

The bolster 3 is a member configured to fix the lower die 6, and supported by an upper surface of the lower frame section 8. In the example, the bolster 3 has a rotationally symmetrical shape about the reference axis C. Specifically, the bolster 3 has a flat plate shape that is a square shape when seen in a plan view. A phase of the shape of the bolster 3 when seen in a plan view (the square shape) and a phase of the shape of the lower frame section 8 and the upper frame section 9 when seen in a plan view (the square shape) in the circumferential direction about the reference axis C (of an apex at which sides cross each other) coincide with each other.

The slide 4 is a member configured to fix the upper die 7, and is disposed to be movable above the bolster 3 in the upward/downward direction (an axial direction of the reference axis C). In the example, the slide 4 has a rotationally symmetrical shape about the reference axis C. Specifically, the slide 4 has a flat plate shape that is a circular shape when seen in a plan view.

The hydraulic cylinder 5 is a source of a force for performing pressing on the workpiece 11, and is supported by the upper frame section 9 in a state in which a central axis thereof coincides with the reference axis C. The hydraulic cylinder 5 includes a piston rod (not shown) disposed therein coaxially with the center axis thereof, and an axial force proportional to a hydraulic pressure is applied to the piston rod according to introduction of the hydraulic pressure. The slide 4 is attached to a lower end portion of the piston rod. That is, the slide 4 is supported by the upper frame section 9 via the hydraulic cylinder 5, and is integrated with the piston rod to move in the upward/downward direction.

The lower die 6 has a rotationally symmetrical shape about a first center axis that is a center axis thereof. The lower die 6 is fixed to the upper surface of the bolster 3 in a state in which the first center axis coincides with the reference axis C.

The upper die 7 has a rotationally symmetrical shape about a second center axis that is a center axis thereof. The upper die 7 is fixed to a lower surface of the slide 4 in a state in which the second center axis coincides with the reference axis C. Accordingly, the lower die 6 and the upper die 7 are disposed coaxially with each other.

Figure 2:
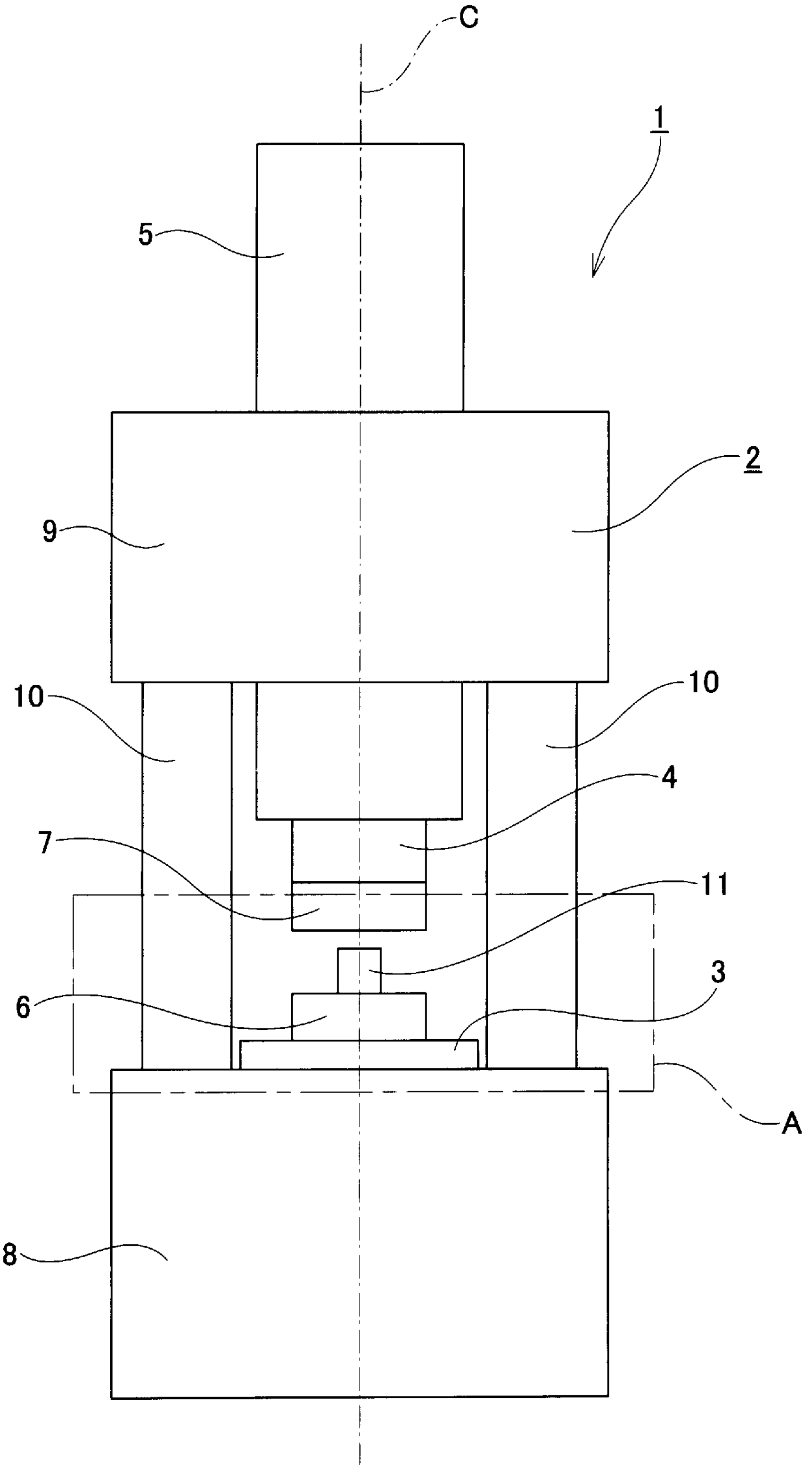
FIG. 2 is a front view schematically showing the press machine of the first example of the embodiment.
Figure 3:
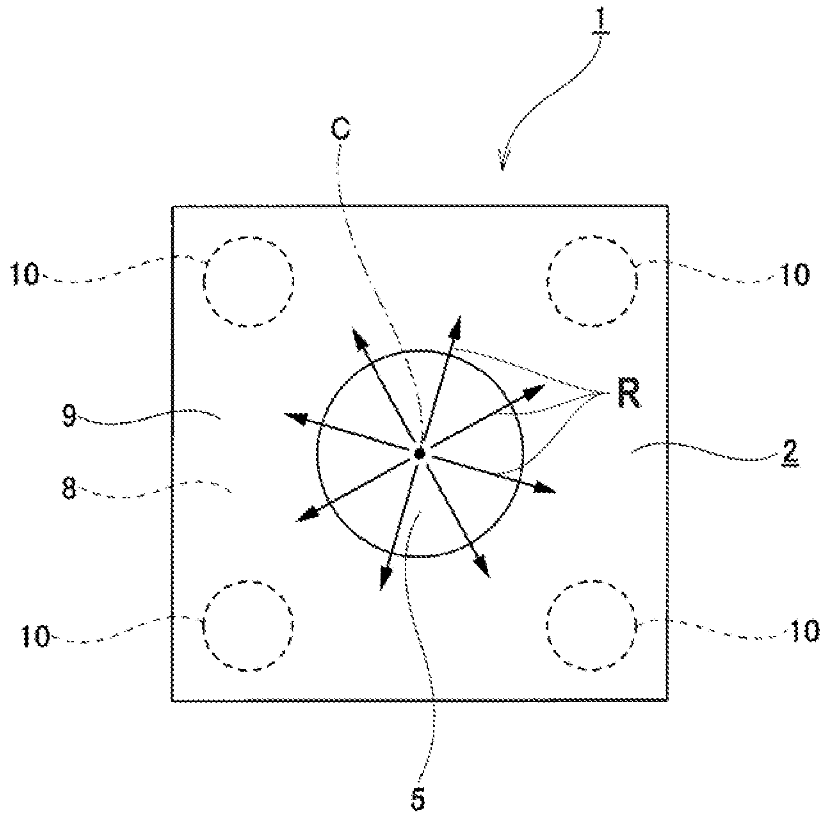
FIG. 3 is a plan view schematically showing the press machine of the first example of the embodiment.
Figure 4:
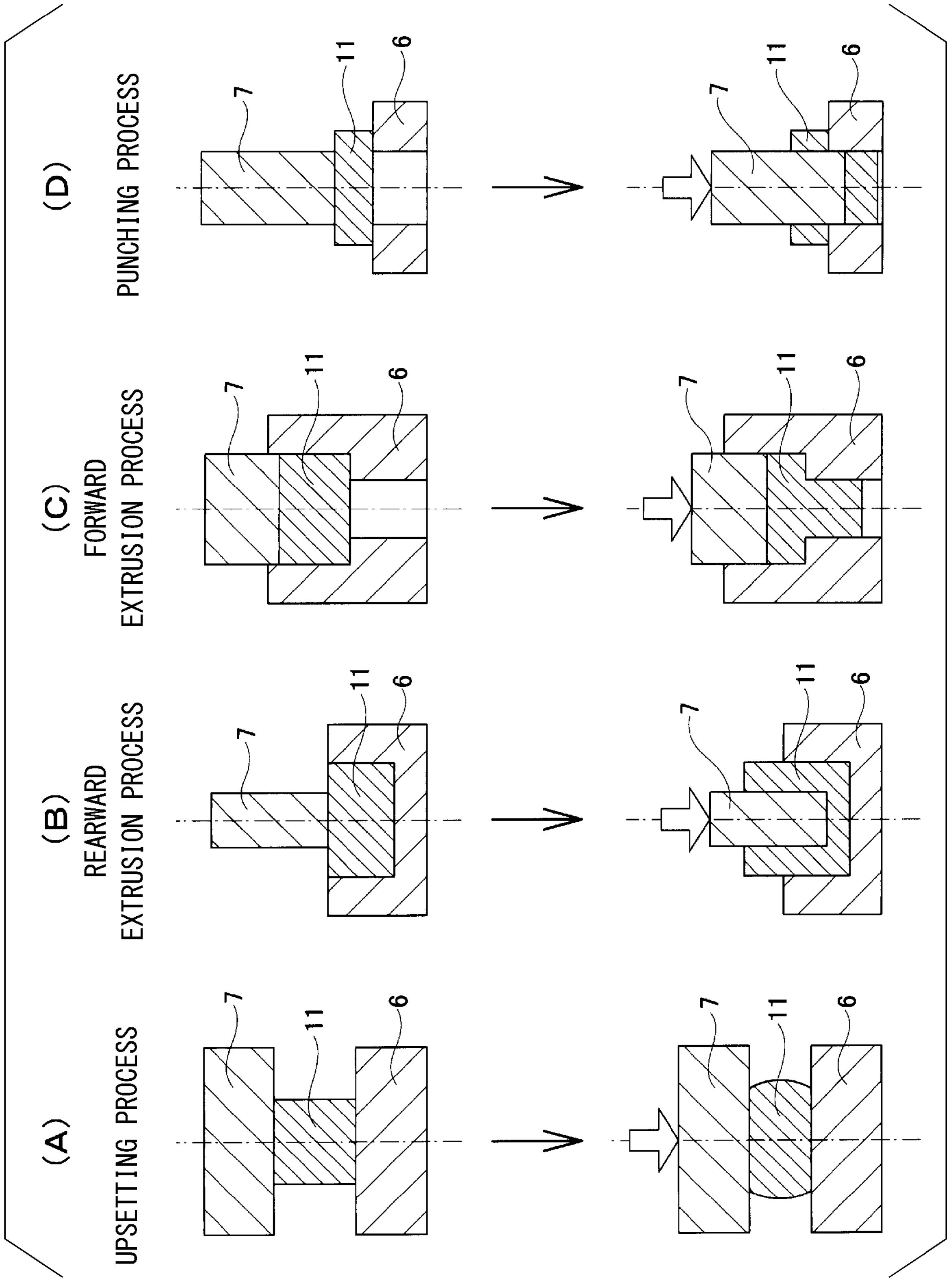
FIGS. 4(A) to 4(D) are cross-sectional views of a lower die, an upper die, and a workpiece schematically, showing four examples of pressing types.

When pressing is performed on the workpiece 11 having a rotationally symmetrical shape about a workpiece center axis that is a center axis thereof using the press machine 1 having the above-mentioned configuration, as shown in FIG. 2, the workpiece 11 is disposed between the lower die 6 and the upper die 7. More specifically, the workpiece 11 is set to the lower die 6 in a state in which the workpiece center axis of the workpiece 11 coincides with the reference axis C. Then, in this state, since the upper die 7 is moved downward by the hydraulic cylinder 5, the upper die 7 approaches the lower die 6 in the axial direction of the reference axis C. Accordingly, pressing is performed on the workpiece 11 between the lower die 6 and the upper die 7.

Further, the type of pressing at this time is not particularly limited. That is, the type of the pressing can be applied to various types of processing known in the related art, in addition to, for example, upsetting process as shown in FIG. 3(A), rearward extrusion process as shown in FIG. 3(B), forward extrusion process as shown in FIG. 3(C), and punching process as shown in FIG. 3(D). In any case, the shapes of the lower die 6 and the upper die 7 are shapes according to the type of the pressing.

In the above-mentioned pressing method of the example, when the pressing is performed on the workpiece 11 having a rotationally symmetrical shape by the press machine 1 including the hydraulic cylinder 5, the first center axis that is a center axis of the lower die 6 and the second center axis that is a center axis of the upper die 7 are disposed coaxially with the reference axis C, and the lower die 6, the upper die 7, the bolster 3, the slide 4 and the frame 2 having rotationally symmetrical shapes about the reference axis C are used, and the workpiece center axis that is a center axis of the workpiece 11 is disposed coaxially with the reference axis C when the pressing is performed on the workpiece 11 between the lower die 6 and the upper die 7. Accordingly, when the pressing is performed on the workpiece 11, a relative inclination amount between the lower die 6 (the first center axis) and the upper die 7 (the second center axis) generated due to elastic deformation of the lower die 6, the upper die 7, the bolster 3, the slide 4 and the frame 2 is minimized. In other words, the pressing can be performed on the workpiece 11 in a state in which the inclination amount is equal to or smaller than a predetermined value that is previously determined. Accordingly, energy loss can be minimized while improving processing accuracy with respect to the workpiece 11.

Second Example of Embodiment

Figure 5:
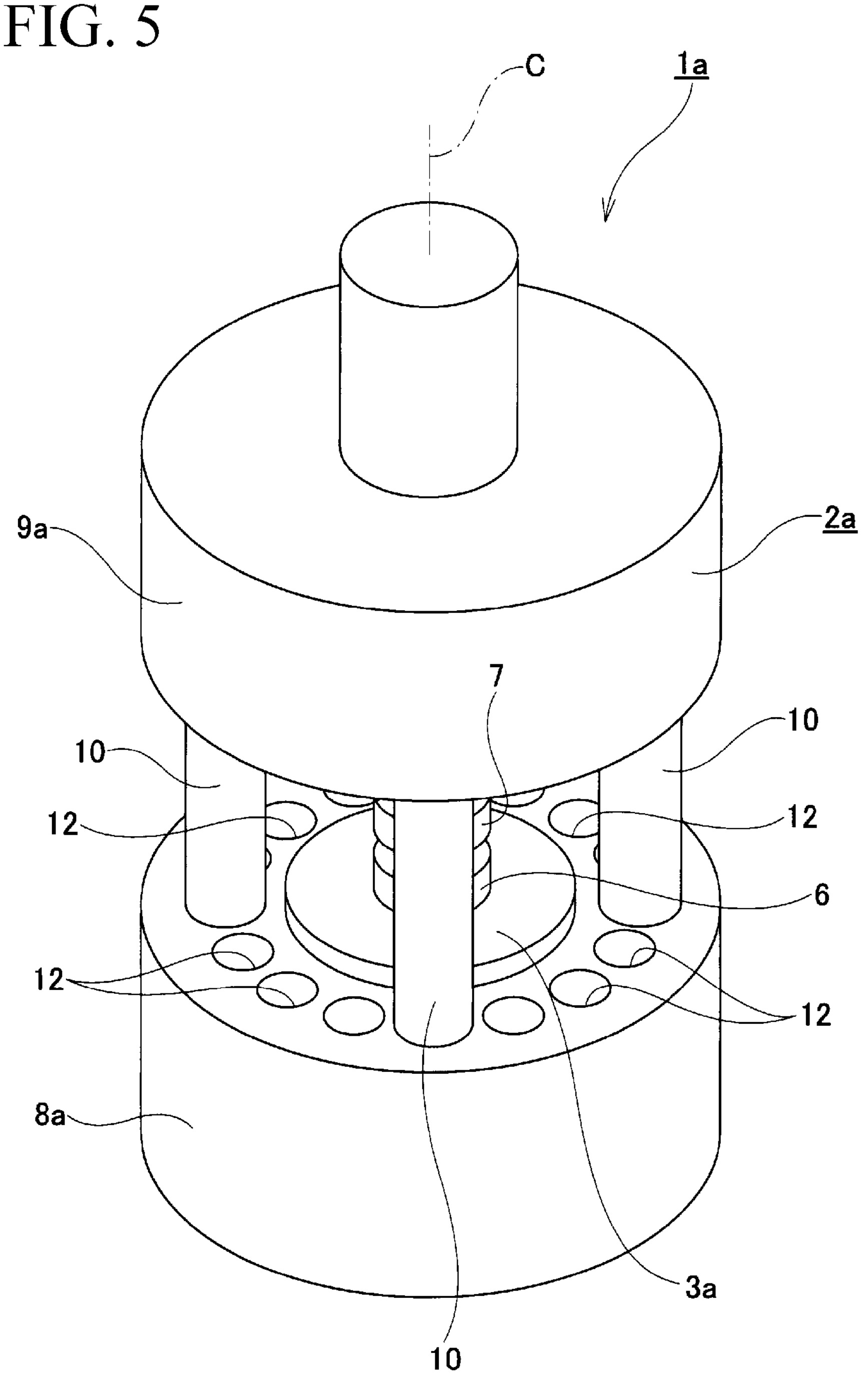
FIG. 5 is a perspective view schematically showing a press machine of a second example of the embodiment.
Figure 6:
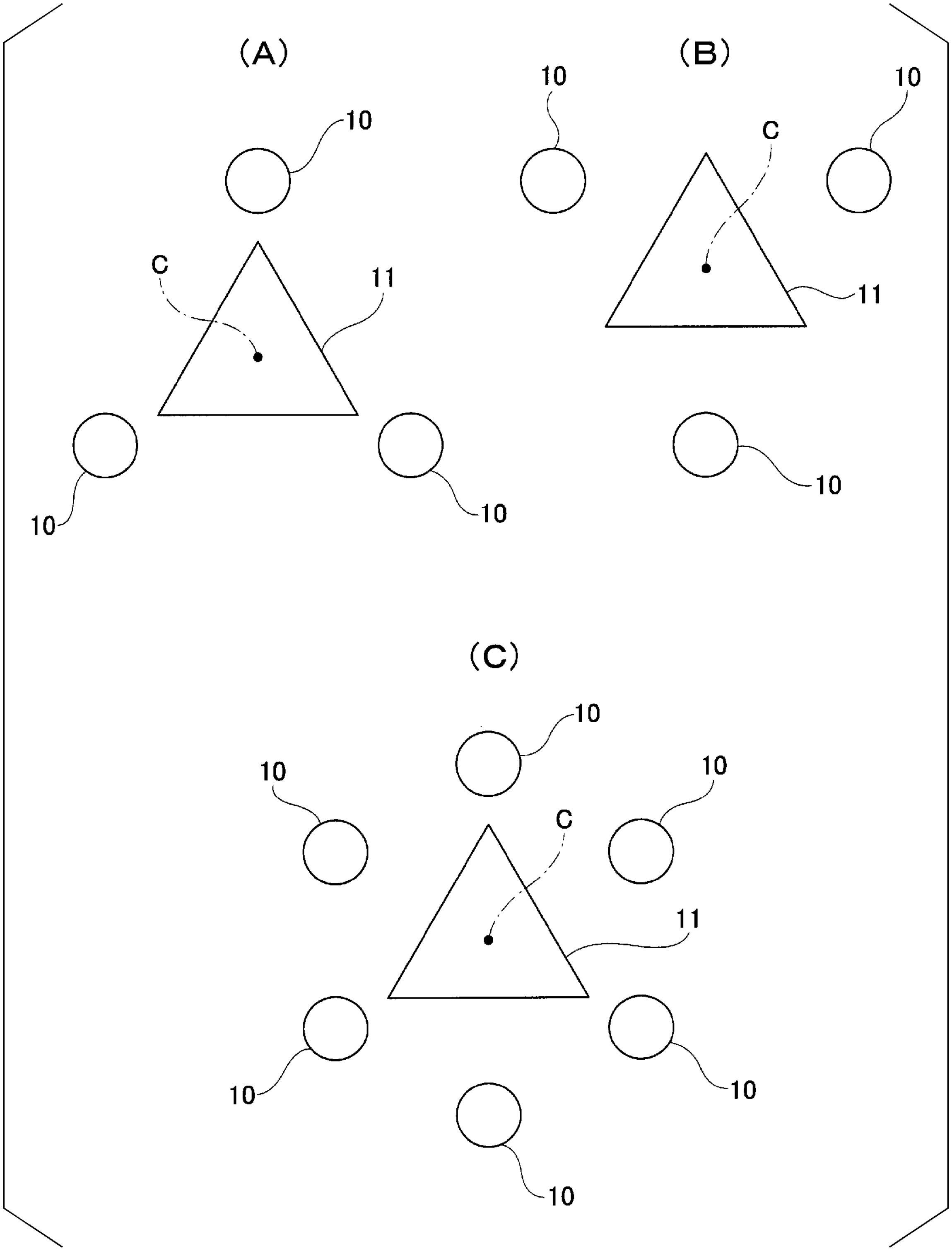
FIGS. 6(A) to 6(C) are plan views schematically showing three examples of a disposition configuration of a pillar section that constitutes a frame when a workpiece has a three-fold symmetric shape about a center axis thereof, according to the second example of the embodiment.
Figure 7:
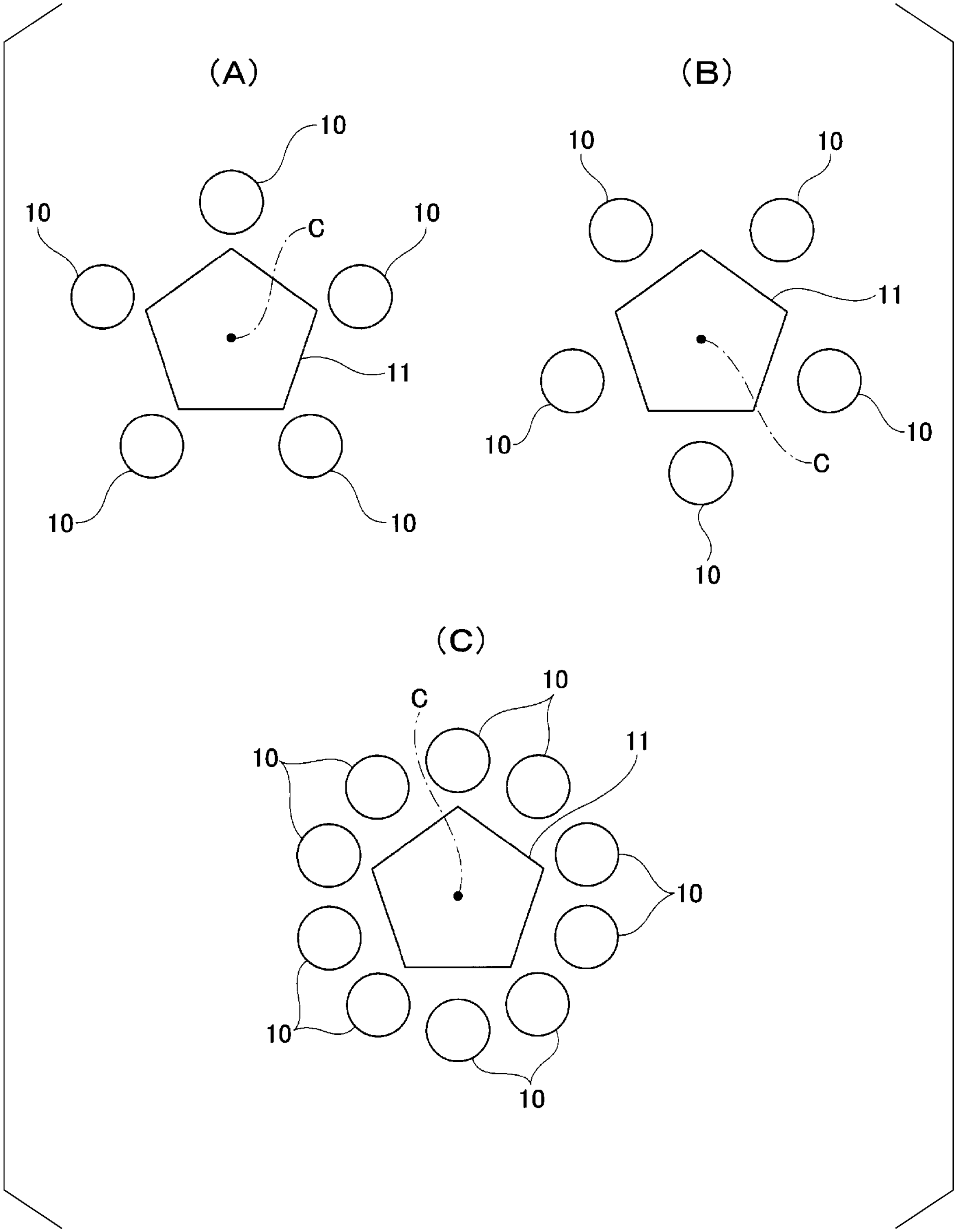
FIGS. 7(A) to 7(C) are plan views schematically showing three examples of a disposition configuration of a pillar section that constitutes a frame when a workpiece has a five-fold symmetric shape about a center axis thereof, according to the second example of the embodiment.

A second example of the embodiment of the present invention will be described with reference to FIGS. 5 to 7.

In the example, each of the lower frame section 8*a* and the upper frame section 9*a* that constitute the frame 2*a* of the press machine 1*a* has a short columnar shape about the reference axis C.

In addition, the frame 2*a* has a configuration that enables change of the number of the pillar sections 10 and a phase of disposition of the pillar sections 10 in the circumferential direction. For this reason, in the example, the lower frame section 8*a* has lower fitting holes 12 formed in a plurality of places at equal intervals in the circumferential direction, each having an upper end that is open, and into which lower end portions of the pillar sections 10 are detachably fitted and held. In addition, the upper frame section 9*a* has upper fitting holes (not shown) formed in a plurality of places at equal intervals in the circumferential direction and opposite to the lower fitting holes 12 in the upward/downward direction, respectively, each having a lower end that is open, and in which upper end portions of the pillar sections 10 are detachably fitted and held. Accordingly, in the plurality of places in which the lower fitting holes 12 and the upper fitting holes are present at equal intervals in the circumferential direction, since whether the pillar sections 10 are installed can be selected, it is possible to change the number of the pillar sections 10 provided in the frame 2*a* and the phase of the disposition of the pillar sections 10 in the circumferential direction.

In the example, when the workpiece 11 and the plurality of pillar sections 10 are integrally seen, the pillar sections 10 are disposed such that an assembly of the workpiece 11 and the plurality of pillar sections 10 has a rotationally symmetrical shape about the reference axis C. Accordingly, upon pressing, a relative inclination amount between the lower die 6 (the first center axis) and the upper die 7 (the second center axis) is more efficiently minimized.

Next, a specific example of the disposition of the pillar sections 10 in which the assembly of the workpiece 11 and the plurality of pillar sections 10 has a rotationally symmetrical shape about the reference axis C will be described with reference to FIGS. 6(A) to 6(C) and FIGS. 7(A) to 7(C).

FIGS. 6(A) to 6(C) is an example of the case in which the number (n: an integer of 2 or more) of rotationally symmetry related to the shape of the workpiece 11 is 3 (n=3). Further, in FIG. 6(A) to 6(C), for convenience, such a shape of the workpiece 11 when seen in a plan view is shown by an equilateral triangle. In order to realize disposition of the pillar sections 10 such that the assembly between the workpiece 11 with n=3 and the plurality of pillar sections 10 has a rotationally symmetrical shape about the reference axis C, the minimum number of the pillar sections 10 is three. For example, as shown in FIG. 6(A) or 6(B), the three pillar sections 10 are disposed at equal intervals in the circumferential direction about the reference axis C. FIG. 6(A) is an example in which the pillar sections 10 are disposed at the same positions as apexes of the equilateral triangle in the circumferential direction, and FIG. 6(B) is an example in which the pillar sections 10 are disposed at the same positions as central sections of each sides of the equilateral triangle in the circumferential direction. In order to realize disposition of the pillar sections 10 such that the assembly between the workpiece 11 with n=3 and the plurality of pillar sections 10 has a rotationally symmetrical shape about the reference axis C, the next number of the pillar sections 10 is six. For example, as shown in FIG. 6(C), the six pillar sections 10 are disposed at equal intervals in the circumferential direction about the reference axis C. FIG. 6(C) is an example in which the pillar sections 10 are disposed at the same positions as each central sections of apexes and each sides of an equilateral triangle in the circumferential direction.

Similarly, when the order of rotational symmetry related to the shape of the workpiece 11 is n, in order to realize the disposition of the pillar sections 10 such that the assembly of the workpiece 11 and the plurality of pillar sections 10 has a rotationally symmetrical shape about the reference axis C, the number of the pillar sections 10 is increased in a relation of $n \times 2^k$ (k: 0 or a positive integer (k=0, 1, 2, 3, . . . )). However, as the number of the pillar sections 10 is increased, it becomes more difficult to supply and discharge the workpiece 11 to the pressing position or to exchange the lower die 6 and the upper die 7, and thus, the minimal number (for example, in the case of n=3, three) is employed normally.

FIGS. 7(A) to 7(C) are examples when the order n of rotational symmetry related to the shape of the workpiece 11 is 5 (n=3). Further, in FIGS. 7(A) to 7(C), for convenience, a shape of the workpiece 11 when seen in a plan view is a regular pentagonal shape. Since this case is also similar to the case of the workpiece 11 with n=3 shown in FIGS. 6(A) to 6(C), overlapping description will be omitted.

In addition, in the example, the bolster 3*a* of the press machine 1*a* has a circular plate shape about a reference axis α. The other configurations and effects are the same as those of the first example of the embodiment.

Third Example of Embodiment

A third example of the embodiment of the present invention will be described with reference to FIGS. 8 and 9.

The example is an example in which the pressing is performed on the workpiece 11*a* having a rotationally asymmetric shape about the workpiece center axis that is a center axis thereof using the hydraulic press machine 1*b*.

Further, when the workpiece 11*a* includes an area having a center axis (a shaft section, a cylindrical section, an annular section, or the like) as a main component, the center axis of the main section can be defined as the workpiece center axis. On the other hand, when the workpiece 11*a* does not include an area having a center axis (a shaft section, a cylindrical section, an annular section, or the like) as a main component, for example, a vertical shaft passing through a geometric center of a the workpiece 11*a* when seen in a plan view, a vertical shaft passing through a center of gravity of the workpiece 11*a*, a vertical shaft passing through a center of a circle or a quadrangle (a rectangular shape, a square shape) that circumscribes a shape of the workpiece 11*a* when seen in a plan view, or the like, is defined as the workpiece center axis. That is, in this case, the position of the workpiece center axis in the workpiece 11*a* is changed depending on how the workpiece center axis is defined.

In any case, in the example, in order to conduct pressing on the workpiece 11*a*, the workpiece center axis is disposed parallel to the reference axis C in a state in which the workpiece 11*a* is disposed between the lower die 6*a* and the upper die 7*a*, (that is, in this state, the workpiece 11*a* has a rotationally asymmetrical shape when seen from the axial direction of the reference axis C). In addition, in this state, an axis of the lower die 6*a* and the upper die 7*a* disposed on the same straight line as the workpiece center axis becomes a center axis (the first center axis, the second center axis) of each of the lower die 6*a* and the upper die 7*a*.

In the example, since the workpiece 11*a* has a rotationally asymmetrical shape about the workpiece center axis, the lower die 6*a* and the upper die 7*a* also has a rotationally asymmetrical shape about a center axis thereof (the first center axis, the second center axis).

As known from the above-mentioned description, in the example, since the position of the workpiece center axis in the workpiece 11*a* is changed depending on how the workpiece center axis is defined, the position of the first center axis in the lower die 6*a* and the position of the second center axis in the upper die 7*a* may also be changed depending on the definition of the workpiece center axis. However, in the example, when the position of the first center axis in the lower die 6*a* and the position of the second center axis in the upper die 7*a*, which are coaxial with each other, are determined, since "a radial direction positioning process" and "a pressing process," which will be described below, can be performed by using these positions, there is no particular problem.

Figure 8:
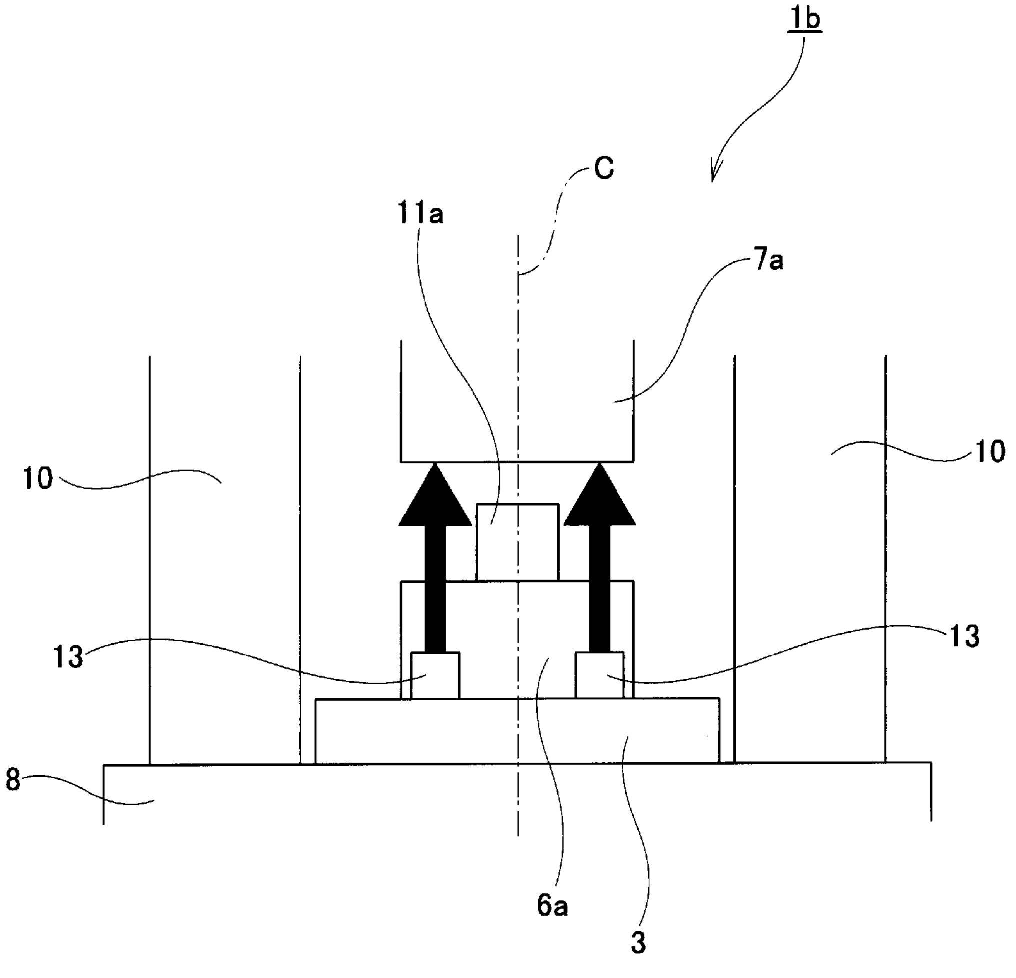
FIG. 8 is an enlarged view corresponding to a portion A in FIG. 2, according to a third example of the embodiment.

In the example, since each of the workpiece 11*a*, the lower die 6*a* and the upper die 7*a* has a rotationally asymmetric shape about a center axis thereof, as shown in FIG. 8, even though the center axes (the first center axis and the second center axis) of the lower die 6*a* and the upper die 7*a* are disposed coaxially with the reference axis C, when the pressing is performed on the workpiece 11*a*, a relative inclination tends to occur between the lower die 6*a* (the first center axis) and the upper die 7*a* (the second center axis).

(Radial Direction Positioning Process)

Here, in the example, a test of conducting a pressing of the workpiece 11*a* is performed for each deviation amount by variously changing positions of the lower die 6*a* and the upper die 7*a* in the radial direction about the reference axis C, specifically, variously changing deviation amounts of center axes of the lower die 6*a* and the upper die 7*a* in the radial direction with respect to the reference axis C. Then, in this test, a relative inclination amount (an inclination angle) between the lower die 6*a* (the first center axis) and the upper die 7*a* (the second center axis) generated when the pressing is performed on the workpiece 11*a* is measured. For this reason, specifically, laser displacement sensors 13 are disposed at four places at equal intervals in the circumferential direction about the reference axis C in the upper surface of the bolster 3 present in a virtual plane perpendicular to the first center axis. Then, a relative inclination amount between the lower die 6*a* and the upper die 7*a* is measured on the basis of measurement results of positions in the upward/downward direction at four places in the circumferential direction about the reference axis C in the lower surface of the upper die 7*a* (may be the lower surface of the slide 4*a*) present in a virtual plane perpendicular to the second center axis by the laser displacement sensors 13. Then, on the basis of the measurement results, a relation between the deviation amount (a lateral axis) and the inclination amount (a vertical axis) as shown in FIG. 9 is obtained.

Figure 9:
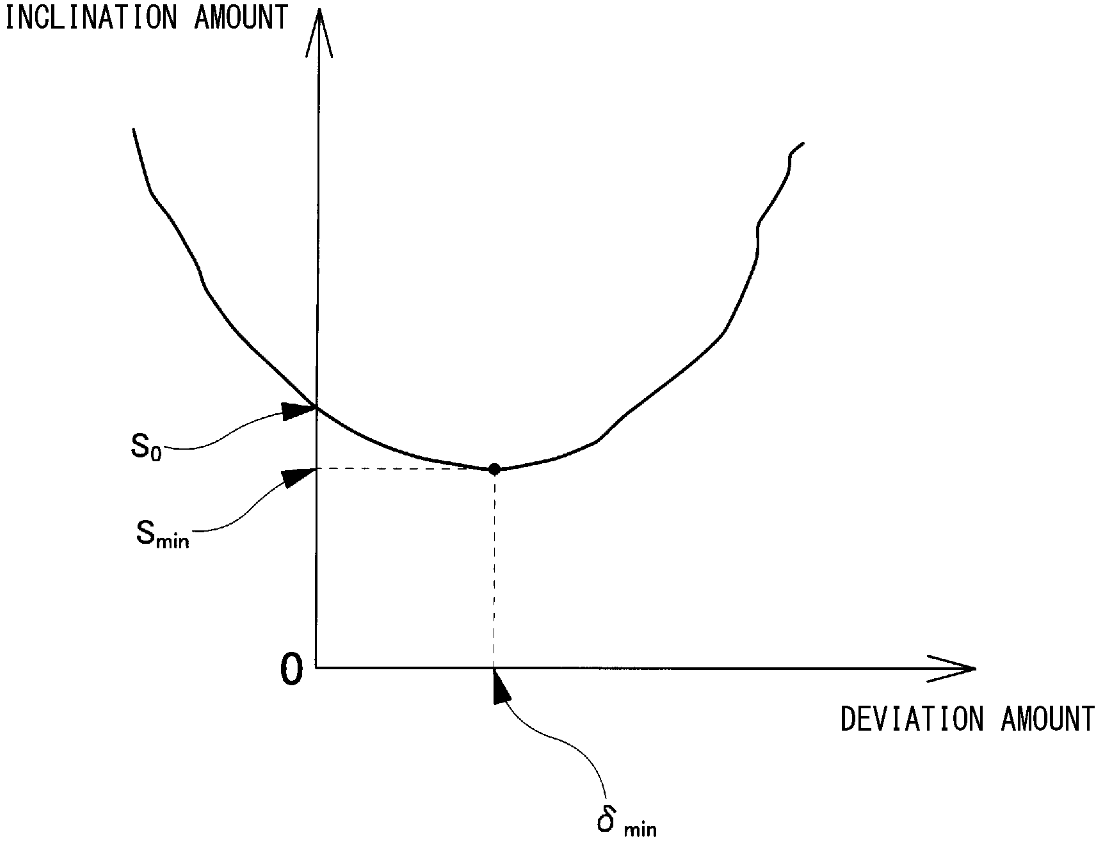
FIG. 9 is a diagram showing a relationship between a deviation amount (a lateral axis) in a radial direction of center axes of a lower die and an upper die with respect to a reference axis and an inclination amount (a vertical axis) between center axes of the upper die and the lower die, during pressing.

Further, for example, the inclination amount (the vertical axis) in the relationship shown in FIG. 9 may be an inclination amount at a starting position of the pressing, may be an inclination amount at an ending position of the pressing (a bottom dead center of the upper die 7*a*), or may be an average value of the inclination amounts during the pressing. However, for processing accuracy with respect to the workpiece 11*a*, since it is important to minimize the inclination amount at the ending position of the pressing, the inclination amount (the vertical axis) in the relationship shown in FIG. 9 is preferable to be the inclination amount at the ending position of the pressing.

In any case, in the example, one position (the deviation amount) in the radial direction of the lower die 6*a* and the upper die 7*a* in which the inclination amount is equal to or smaller than a predetermined value is determined using the relationship in FIG. 9 obtained as described above. In particular, in the example, the predetermined value related to the inclination amount is set to a value smaller than an inclination amount $S_0$ when the deviation amount is 0. That is, in the example, one position in which a position in the radial direction at which the deviation amount is not 0 and a position in the radial direction at which the inclination amount is smaller than when the deviation amount is 0 (preferably, a position in the radial direction at which the inclination amount is a minimum value $S_{min}$ (a deviation amount $\delta_{min}$)) are determined using the relationship in FIG. 9.

(Pressing Process)

Then, in a state in which the lower die 6*a* and the upper die 7*a* are disposed at one position in the radial direction determined as described above (in other words, in a state in which a deviation amount in the radial direction of the center axes of the lower die 6*a* and the upper die 7*a* with respect to the reference axis C is adjusted to the deviation amount determined as described above), the pressing is performed on the workpiece 11*a*. As a result, since the inclination amount when the pressing is performed on the workpiece 11*a* is minimized, energy loss can be reduced while improving processing accuracy with respect to the workpiece 11*a*.

Further, when the above-mentioned test is performed, while the direction (the radial direction) in which the center axes of the lower die 6*a* and the upper die 7*a* are shifted with respect to the reference axis C can be selected innumerably, an arbitrary direction may be selected. In addition, the selected direction is not limited to one and may be plural. When the plurality of selected directions are provided, the relationship in FIG. 9 is obtained for each selected direction. Then, when the relationship in which the inclination amount can be minimized is employed from these relationships, processing accuracy with respect to the workpiece 11 can be more efficiently improved.

Further, in the example, while the deviation amount in the relationship in FIG. 9 is the deviation amount of the center axes of the lower die 6*a* and the upper die 7*a* with respect to the reference axis C, when the present invention is performed, the deviation amount in the relationship in FIG. 9 may be a deviation amount other than the center axes of the lower die 6*a* and the upper die 7*a* with respect to the reference axis C (for example, parts of outer circumferential surfaces of the lower die 6*a* and the upper die 7*a* in the circumferential direction).

Further, the laser displacement sensors 13 may be removed after the above-mentioned test is completed or may be left as it is.

In the example, since the energy loss can be reduced while improving processing accuracy with respect to the workpiece 11*a* by changing the deviation amount of the conventional press machine, processing costs of the workpiece 11*a* are minimized. The other configurations and effects are similar to those of the first example of the embodiment.

Fourth Example of Embodiment

Figure 10:
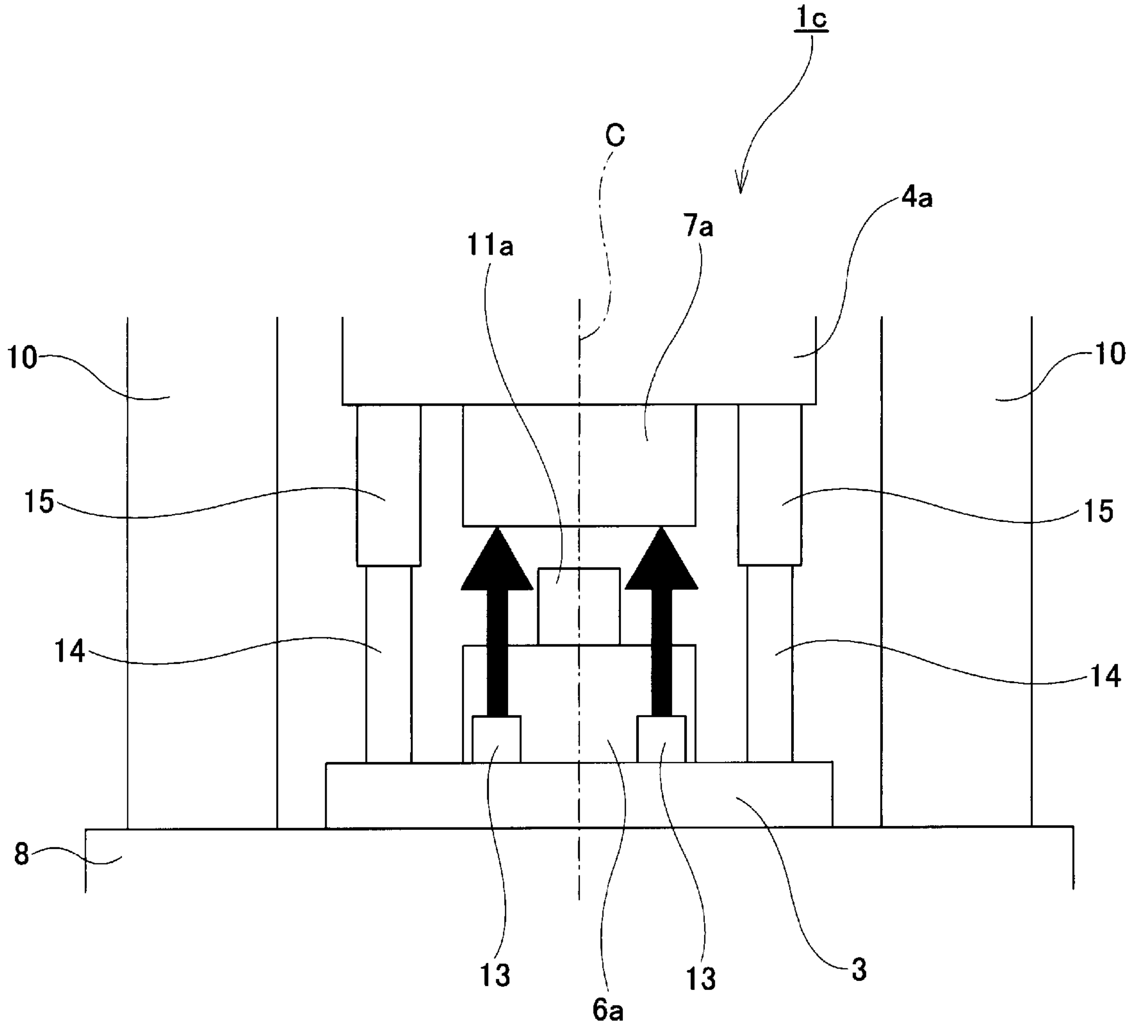
FIG. 10 is a view similar to FIG. 8, according to a fourth example of the embodiment.

A fourth example of the embodiment of the present invention will be described with reference to FIG. 10. The example is a variant of the third example of the embodiment.

In the example, the hydraulic press machine 1*c* includes guide rods 14 and guide bushes 15. The guide rods 14 extend upward from four places at equal intervals in the circumferential direction about the reference axis C in the upper surface of the bolster 3 present in a virtual plane perpendicular to the first center axis of the lower die 6*a*. The guide bushes 15 extend downward from four places matching with the guide bushes 15 in the upward/downward direction in the lower surface of the slide 4*a* present in a virtual plane perpendicular to the second center axis of the upper die 7*a*. Then, the guide rods 14 and the guide bushes 15 present at the positions matching with each other in the upward/downward direction are fitted to each other with no rattling and enabling relative displacements with each other in the upward/downward direction. Accordingly, a relative inclination amount between the lower die 6*a* (the first center axis) and the upper die 7*a* (the second center axis) generated when the pressing is performed on the workpiece 11*a* is further minimized.

Further, the inclination amount generated when the pressing is performed on the workpiece 11*a* may be further minimized by increasing the numbers of the guide rods 14 and the guide bushes 15 or increasing diameters of the guide rods 14 and the guide bushes 15. However, when the numbers of the guide rods 14 and the guide bushes 15 are increased or the diameters of the guide rods 14 and the guide bushes 15 are increased, manufacturing costs of the press machine 1*c* are increased to that extent. In this regard, in the example, the inclination amount can be minimized by adjusting the deviation amount in the radial direction of the center axes of the lower die 6*a* and the upper die 7*a* with respect to the reference axis C using the relationship in FIG. 9. For this reason, there is no need to excessively increase the numbers of the guide rods 14 and the guide bushes 15 or to excessively increase the diameters of the guide rods 14 and the guide bushes 15. Accordingly, manufacturing costs of the press machine 1*c* are minimized to that extent.

Further, the inclination amount can also be further minimized by changing parameters, which may exert an influence, such as the positions of the guide rods 14 and the guide bushes 15, the diameter of the lower die 6*a*, the diameter of the upper die 7*a*, or the like. When the parameters are three or more, orthogonal arrays can be used to employ combinations in which the inclination amount is further reduced (preferably, minimized). The other configurations and effects are similar to those of the third example of the embodiment.

Fifth Example of Embodiment

A fifth example of the embodiment of the present invention will be described with reference to FIGS. 11 and 12.

The example is an example in which pressing is performed on a workpiece using a mechanical press machine 1*d*. The workpiece that is a processing target may be the workpiece 11 having a rotationally symmetric shape about the workpiece center axis that is a center axis thereof, or may be a workpiece 11*a* having a rotationally asymmetric shape about a workpiece center axis that is a center axis thereof.

In the press machine 1*d* of the example, an outer circumferential edge portion of the slide 4*b* is movably guided to the frame 2*b* in the upward/downward direction (an axial direction of the reference axis C). In addition, the slide 4*b* can be moved in the upward/downward direction by a link mechanism 16 configured to transmit power generated by an electric motor (not shown).

The link mechanism 16 is disposed above the slide 4*b*, and includes a crankshaft 17 that is a first link member, and a connecting rod 18 that is a second link member. The crankshaft 17 includes a pair of rotary shaft sections 19 disposed coaxially with both side portions in the axial direction, an offset shaft section 20 which is disposed in an intermediate section in the axial direction and which is parallel to the pair of rotary shaft sections 19, and a pair of connecting sections 21 configured to connect end portions of the pair of rotary shaft sections 19 which are close to each other to both end portions of the offset shaft section 20, respectively. In such a crankshaft 17, the pair of rotary shaft sections 19 and the offset shaft section 20 are disposed horizontally, and the pair of rotary shaft sections 19 are supported to be rotatable with respect to the frame 2*b*. The connecting rod 18 has an upper end portion supported to be rotatable with respect to the offset shaft section 20 about the offset shaft section 20, and a lower end portion supported to be rotatable with respect to a central section of the upper end portion of the slide 4*b* about a shaft 22 which is parallel to the offset shaft section 20. That is, the link mechanism 16 constitutes a slider-crank mechanism configured to reciprocally move the slide 4*b* in the upward/downward direction according to rotation of the crankshaft 17 about the pair of rotary shaft sections 19 through combination with the slide 4*b* in this way. Further, rotation of the crankshaft 17 about the pair of rotary shaft sections 19 is performed using an electric motor (not shown) as a power source.

Figure 12:
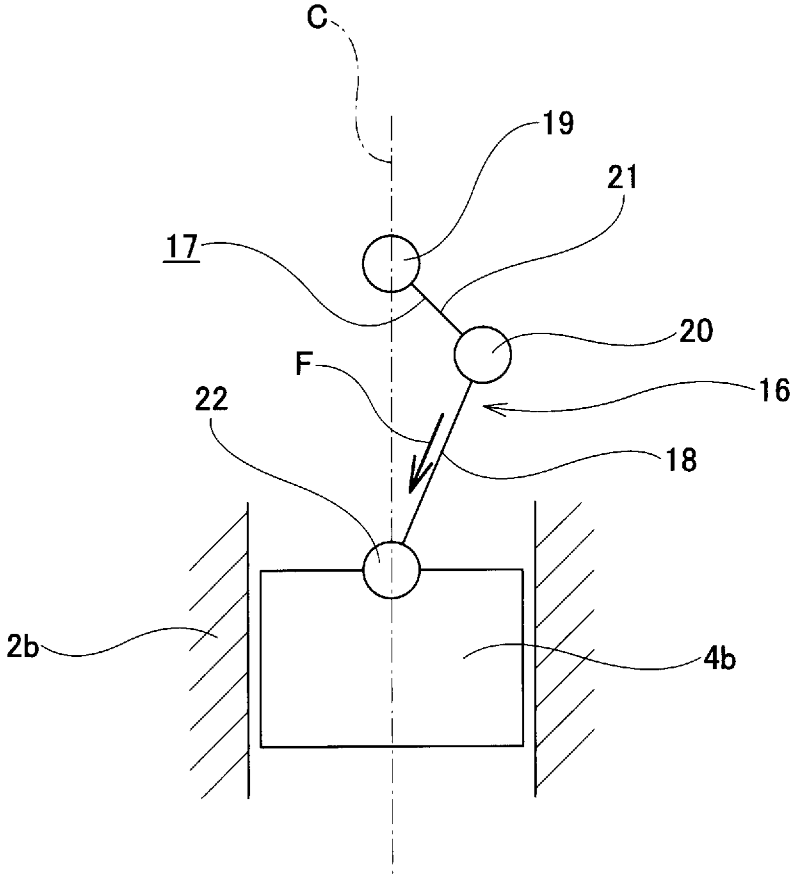
FIG. 12 is a cross-sectional view taken along line B-B in FIG. 11.

In the press machine 1*d* of the example, as shown in FIG. 12, a force F inclined with respect to the reference axis C is applied to the slide 4*b* from the connecting rod 18 due to the inclination of the connecting rod 18 with respect to the reference axis C. A component in a direction perpendicular to the upward/downward direction that is a moving direction of the slide 4*b* (the axial direction of the reference axis C) is included in the force F.

Figure 11:
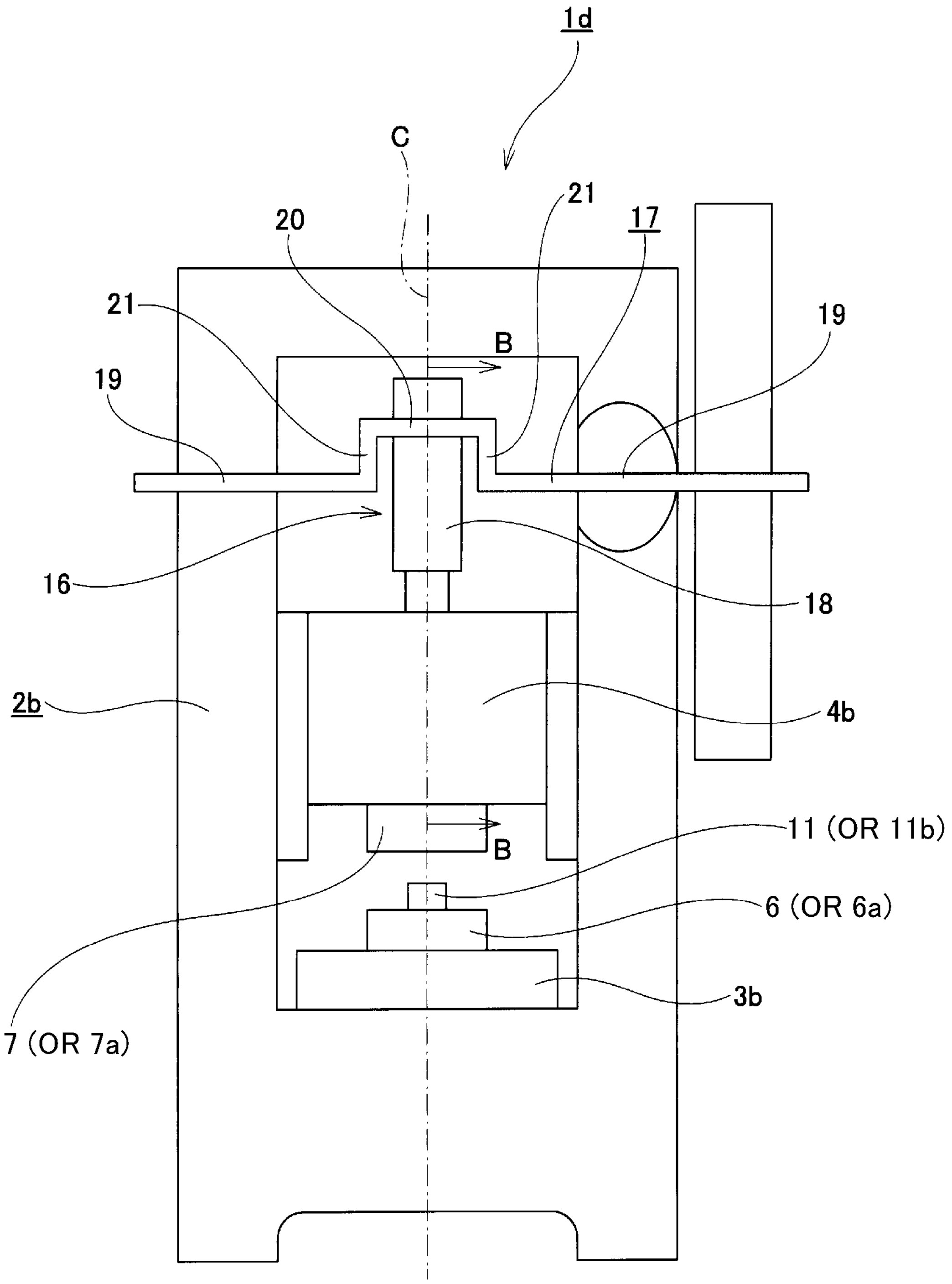
FIG. 11 is a front view schematically showing a press machine of a fifth example of the embodiment.

For this reason, as shown in FIG. 11, even though each of the center axes (the first center axis and the second center axis) of the lower die 6 (or 6*a*) and the upper die 7 (or 7*a*) disposed coaxially with each other is disposed coaxially with the reference axis C, when the pressing is performed on the workpiece 11 (or 11*a*), a relative inclination tends to occur between the lower die 6 (or 6*a*) (the first center axis) and the upper die 7 (or 7*a*) (the second center axis) as the slide 4*b* is inclined due to the component.

Here, even in the case of the example, the same test as that of the third example of the embodiment is performed, and the relationship shown in FIG. 9, i.e., a relationship between the deviation amount in the radial direction of the center axes of the lower die 6 (or 6*a*) and the upper die 7 (or 7*a*) with respect to the reference axis C and the relative inclination amount between the lower die 6 (or 6*a*) (the first center axis) and the upper die 7 (or 7*a*) (the second center axis) which is generated when the pressing is performed on the workpiece 11 (or 11*a*), is obtained. Then, the center axes of the lower die 6 (or 6*a*) and the upper die 7 (or 7*a*) are disposed at places where the deviation amount is not 0 and places where the inclination amount is smaller than that in the case in which the deviation amount is 0 (preferably, a place where the inclination amount is minimized) using the relationship. Then, since the pressing is performed on the workpiece 11 (or 11*a*) in this state, energy loss is reduced while improving processing accuracy with respect to the workpiece 11 (or 11*a*).

Further, in the case of the example, since a rotational speed of the crankshaft 17 upon pressing is changed to a small value after the deviation amount is determined, it is possible to further decrease the inclination amount. The other configurations and effects are the same as those of the third example of the embodiment.

The present invention may be performed by appropriately combining the components of the embodiments within a range in which there is no contradiction. The present invention can be performed, for example, when metal parts that constitutes a rolling bearing (a hub wheel, an inner ring, an outer ring, or the like, that constitutes a hub unit bearing configured to rotatably support the inner ring or the outer ring that constitute the rolling bearing, wheels of an automobile, or the like, with respect to a suspension apparatus) are manufactured.

REFERENCE SIGNS LIST

1, 1*a*, 1*b*, 1*c*, 1*d* press machine 2, 2*a*, 2*b* frame 3, 3*a*, 3*b* bolster 4, 4*a*, 4*b* slide 5 hydraulic cylinder 6, 6*a* lower die 7, 7*a* upper die 8, 8*a* lower frame section 9, 9*a* upper frame section 10 pillar section 11, 11*a* workpiece 12 lower fitting hole 13 laser displacement sensor 14 guide rod 15 guide bush 16 link mechanism 17 crankshaft 18 connecting rod 19 rotary shaft section 20 offset shaft section 21 connecting section 22 shaft

The invention claimed is:

1. A method of performing pressing on a workpiece using a press machine which comprises:

a frame having a reference axis, a first die supported by the frame, a second die supported by the frame, and configured to enable a retreating and an approaching movement with respect to the first die in an axial direction of the reference axis, and a hydraulic cylinder configured to generate a force in a direction in which the second die approaches the first die, the pressing method comprising:

performing radial direction positioning, which includes:

measuring, for each of multiple different radial deviations, which are deviations about a center axis in a radial direction between the first die and the second die, relative inclination amounts between the first die and the second die generated when pressing is performed on the workpiece by pressing the workpiece between the first die and the second die by causing the second die to approach the first die by pressing the second die against the first die using the hydraulic cylinder in a state in which the workpiece is disposed between the first die and the second die, obtaining, using the measured relative inclination amounts for each of the multiple different radial deviations, a relationship between the measured relative inclination amounts and the multiple different radial deviations, and radially positioning the first die and the second die so as to minimize the relative inclination amount between the first die and the second die, and performing the pressing on the workpiece in a state in which the first die and the second die are disposed according to a set radial positions of the first die and the second die which was determined in the radial direction positioning process, wherein the relative inclination amounts between the first die and the second die are measured using a laser displacement sensor.

2. A method of performing pressing on a workpiece using a press machine which comprises:

a frame having a reference axis, a first die supported by the frame, a second die supported by the frame, and configured to enable a retreating and an approaching movement with respect to the first die in an axial direction of the reference axis, and a link mechanism including a driving source, a first link member rotatably driven by the driving source and a second link member that is provided with one end portion thereof being rotatably supported by a portion of the first link member which is deviated in the radial direction from a rotation center axis of the first link member and that is provided with another end portion which rotatably supports the second die, the pressing method comprising:

performing radial direction positioning, which includes:

measuring, for each of multiple different radial deviations, which are deviations about the center axis in a radial direction between the first die and the second die, relative inclination amounts between the first die and the second die generated when pressing is performed on the workpiece by pressing the workpiece between the first die and the second die by causing the second die to approach the first die by pressing the second die against the first die using the link mechanism in a state in which the workpiece is disposed between the first die and the second die, obtaining, using the measured relative inclination amounts for each of the multiple different radial deviations, a relationship between the measured relative inclination amounts and the multiple different radial deviations, and radially positioning the first die and the second die so as to minimize the relative inclination amount between the first die and the second die, and performing the pressing on the workpiece in a state in which the first die and the second die are disposed according to a set radial positions of the first die and the second die which was determined in the radial direction positioning process, wherein the relative inclination amounts between the first die and the second die are measured using a laser displacement sensor.

* * * * *